(12) United States Patent
Chen et al.

(10) Patent No.: US 7,035,475 B1
(45) Date of Patent: Apr. 25, 2006

(54) NON-TRADITIONAL ADAPTIVE NON-UNIFORMITY COMPENSATION (ADNUC) SYSTEM EMPLOYING ADAPTIVE FEEDFORWARD SHUNTING AND OPERATING METHODS THEREFOR

(75) Inventors: Hai-Wen Chen, Tucson, AZ (US);
Thomas K. Lo, Tucson, AZ (US);
Harry A. Schmitt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/335,426

(22) Filed: Jun. 17, 1999

(51) Int. Cl.
*G06K 9/03* (2006.01)

(52) U.S. Cl. ........................ 382/254; 382/260
(58) Field of Classification Search ............... 382/254, 382/260–269, 232, 236; 348/409.1, 411.1, 348/412.1, 413.1, 415.1, 416.1
See application file for complete search history.

(56) References Cited

U.S. PATENT DOCUMENTS

| | | | |
|---|---|---|---|
| 5,095,354 A * | 3/1992 | Sokawa et al. | 348/452 |
| 5,903,659 A | 5/1999 | Kilgore | |
| 6,211,515 B1 * | 4/2001 | Chen et al. | 250/252.1 |
| 6,243,498 B1 * | 6/2001 | Chen et al. | 382/260 |
| 6,285,710 B1 * | 9/2001 | Hurst et al. | 375/240.12 |

FOREIGN PATENT DOCUMENTS

| | | |
|---|---|---|
| JP | 2000101874 A * | 4/2000 |
| WO | WO 200079782 A2 * | 12/2000 |

* cited by examiner

*Primary Examiner*—Thomas D. Lee
*Assistant Examiner*—Stephen Brinich
(74) *Attorney, Agent, or Firm*—Thomas J. Finn; Leonard A. Alkov; Karl A. Bick

(57) ABSTRACT

A non-traditional, non-uniformity compensation processor. In the illustrative embodiment, the feedforward adaptive non-uniformity compensation processor includes a multiplier which receives a video image and generates a compensated video image by multiplying the video signal by one of a noise reducing constant or one. The inventive processor further includes a shunting multiplication processor which supplies a selected one of the noise reducing constant or one to the multiplier in response to the presence of one of fixed pattern noise (FPN) and temporal noise (TN) in adjacent frames of the video image. In an illustrative embodiment, the inventive system cones the output of an FPA to generate a coned output signal. The system isolates the FPN in the coned output signal and feedforward processes the coned output signal on a pixel-by-pixel basis to generate a FPN-reduced output signal. In an exemplary embodiment, the feedforward processing step includes the step of multiplying the coned output signal by a predetermined value which is substantially smaller, i.e., approximately zero, than the coned output signal.

19 Claims, 15 Drawing Sheets

FIG. 9a
Frame 3
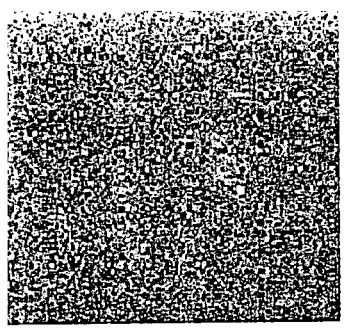
FIG. 9b
Frame 15
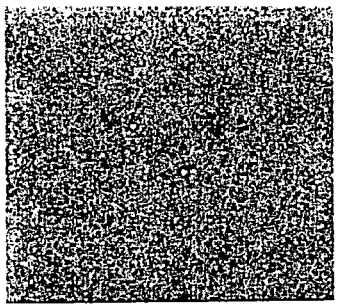
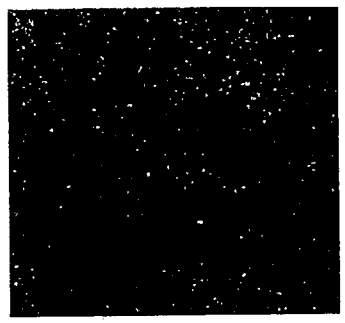
Frame 25
FIG. 9c
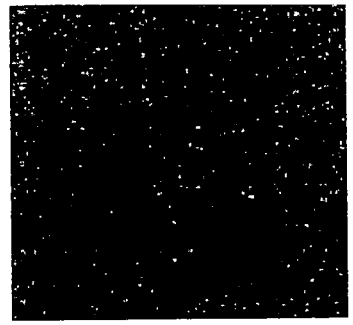
Frame 38
FIG. 9d a1t_13: IMAGE # 37

Thres:FPN=3. TN=2: IMAGE # 38

INPUT IMAGE # 39

INPUT IMAGE # 40

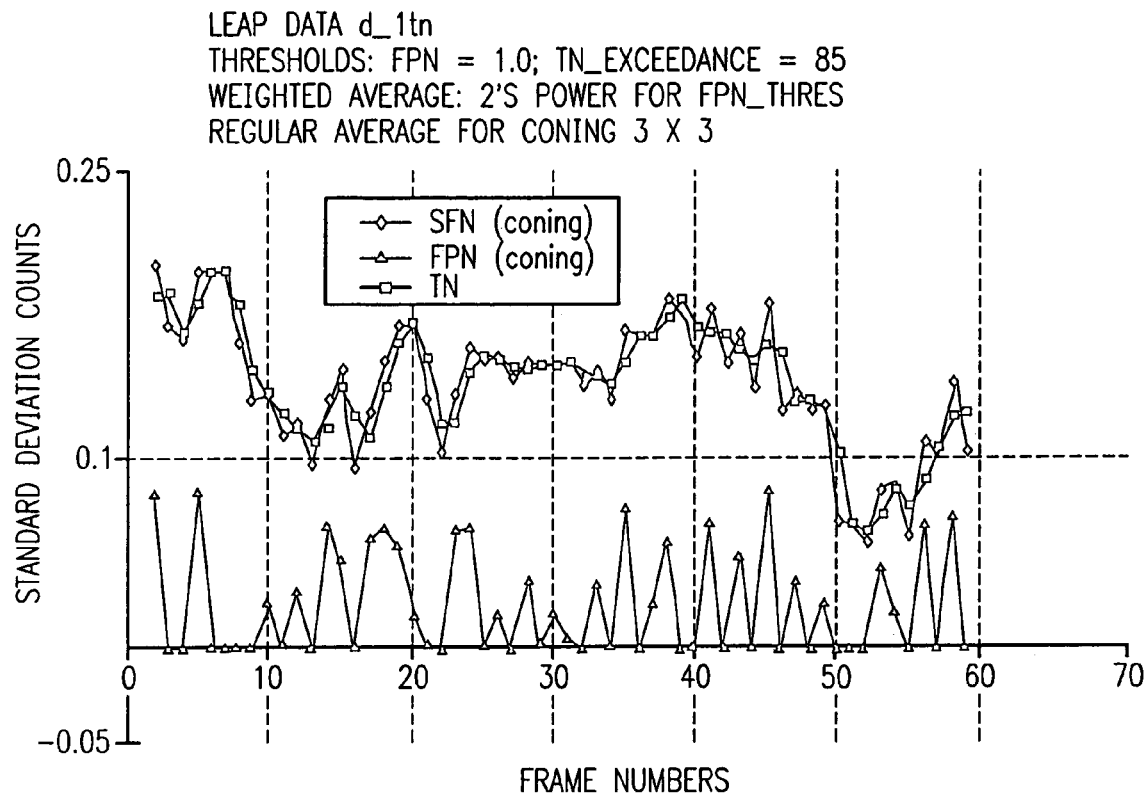
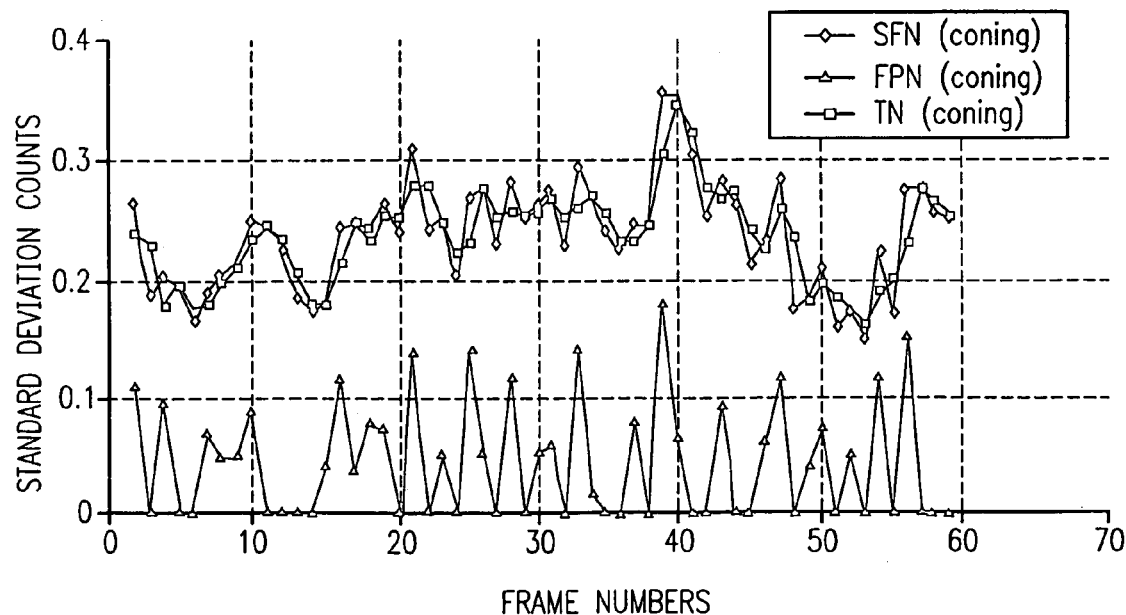

NON-TRADITIONAL ADAPTIVE NON-UNIFORMITY COMPENSATION (ADNUC) SYSTEM EMPLOYING ADAPTIVE FEEDFORWARD SHUNTING AND OPERATING METHODS THEREFOR

BACKGROUND OF THE INVENTION

1. Field of the Invention

The present invention relates to systems and corresponding methods for removal of fixed pattern noise (FPN) from sensor images. More specifically, the present invention relates to systems and corresponding methods employing feedforward shunting for removal of fixed pattern noise (FPN) from sensor images.

2. Description of the Related Art

Focal plane arrays (FPAs) are used in various applications to capture images for subsequent processing. As disclosed in U.S. Pat. No. 5,903,659, the teachings of which are incorporated herein by reference, air-to-air missiles have employed infrared sensors with FPAs to capture infrared images of a target being tracked. The FPA typically contains n×n infrared detectors, where each detector has a slightly different sensitivity to infrared radiation. This non-uniform sensitivity yields fixed pattern noise (FPN), which manifests itself in the image, resulting in some pixels which are too bright and some which are too dark. In short, the fixed pattern noise (FPN) manifests as sensor-fixed artifacts induced by nonuniform response of the focal plane array (FPA). The nonuniform response causes the FPA output to be spatially varying even when illuminated by a uniform source.

Some missile sensor processors have employed rotating optical elements and complimentary techniques to reduce FPN. These techniques have often introduced significant scene artifacts in the output image, which cause the missile tracker to mis-track the target. Efforts to reduce the scene artifact growth have resulted in insufficient fixed pattern noise reduction under certain flight conditions.

Other techniques for suppressing or reducing FPN have also been implemented. It will be noted that techniques such as those based on stored nonuniformity correction factors can correct for the nonuniform array response under static conditions. But dynamic inputs, such as changing photon flux induced by dome heating, requires dynamic or adaptive non-uniformity compensation. Because FPNs are fixed on the focal plane, and hence are temporally correlated, they present a more difficult false alarm problem than that presented by temporally uncorrelated temporal noise (TN).

Yet another technique for reducing FPN employs coning, i.e., selective readout of the FPA following a repetitive, multi-frame pattern. It should be mentioned that a FPA coning system allows the offset terms to suppress only the (FPA fixed) FPN without significantly reducing the target intensities whose locations in the FPA are changed from frame to frame. However, there are several problems with the traditional GEN2 ADNUC design. For example, the use of an aggressive transfer function creates deep black holes, sometimes referred to as black ghosts. These holes are caused by the inversion of the outside scene objects and targets. As a result, the intensities of any scene objects and targets nearby, or overlapping with, the black holes will be reduced and distorted.

In addition, the feedback additive process of the offset terms will often cause an increase in temporal noise (TN). Current ADNUC systems, e.g., the GEN2 ADNUC system, are not designed to remove temporal noise (TN). Traditional ADNUC systems use an additive feedback technique wherein a correction-offset term is accumulated from an error-term which is generated from the output (de-meaned) image. The correction term is then subtracted from the next input image. The feedback coefficients, i.e., the non-linear transfer functions, can not be set too aggressively if one desires to avoid an increase of TN and black-hole artifacts. Therefore, depending on the feedback coefficients, it may take many image frames for the conventional ADNUC system to reduce the FPN from an initial high value to a low equilibrium value.

Finally, as discussed in copending patent application Ser. No. 09/175,213, and 09/275,223 (the teachings of which are incorporated herein by reference) the feedback accumulative process will slow down the adaptive process for reducing FPN and non-uniformity.

Thus, there is a need in the art for a technique for removal of fixed pattern noise (FPN) from sensor images without introducing significant scene artifacts. It would be highly desirable to provide a system and corresponding method employing feedforward shunting techniques for removal of FPN from sensor images without increasing temporal noise associated with the sensor images. There is a particular need for a system and corresponding method employing feedforward shunting for removal of FPN from sensor images which would reduce FPN from an initial high value to a relatively low equilibrium state over a minimum number of frames. Ideally, the system and corresponding method would employ feedforward shunting techniques for removal of FPN from sensor images without increasing the magnitude of black-hole artifacts, i.e., without either reducing or distorting the target signals.

SUMMARY OF THE INVENTION

The need in the art is addressed by the non-traditional, non-uniformity compensation processor of the present invention. In an illustrative embodiment, the feedforward adaptive non-uniformity compensation processor includes a multiplier which receives a video image and generates a compensated video image by multiplying the video signal by one of a noise reducing constant or one. The inventive processor further includes a shunting multiplication processor which supplies a selected one of the noise reducing constant or one to the multiplier in response to the presence of one of fixed pattern noise (FPN) and temporal noise (TN) in adjacent frames of the video image.

Advantageously, an adaptive non-uniformity compensation processor according to the present invention includes a subtractor which receives a video image and subtracts a mean value of the video image to thereby generate a de-meaned video image. A first processor generates a current average frame responsive to the de-meaned video image and a previous averaged frame and outputs a value indicative of fixed pattern noise (FPN) from the current and previous averaged frames. A second processor selectively generates first and second multiplication constants responsive to the value and the previous averaged frame. The selected one of the first and second multiplication constants is multiplied by the de-meaned video image to generate a shunt processed video signal. An adder adds the mean value of the video image to the shunt processed video image to generate a compensated video image.

In an illustrative embodiment, the inventive system cones the output of an FPA to generate a coned output signal. The system isolates the FPN in the coned output signal and feedforward processes the coned output signal on a pixelby-pixel basis to generate an FPN-reduced output signal. In an exemplary embodiment, the feedforward processing step includes the step of multiplying the coned output signal by a predetermined value which is substantially smaller, i.e., approximately zero, than the coned output signal.

BRIEF DESCRIPTION OF THE DRAWINGS

FIGS. 9a–9d illustrate black-hole artifacts located in several of the image frames illustrated in FIG. 2.

FIG. 15 illustrates noise analysis in accordance with the ADNUC processor depicted in FIG. 8.

FIG. 18 illustrates noise analysis of the second set of standard test data in accordance with the ADNUC processor depicted in FIG. 8.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
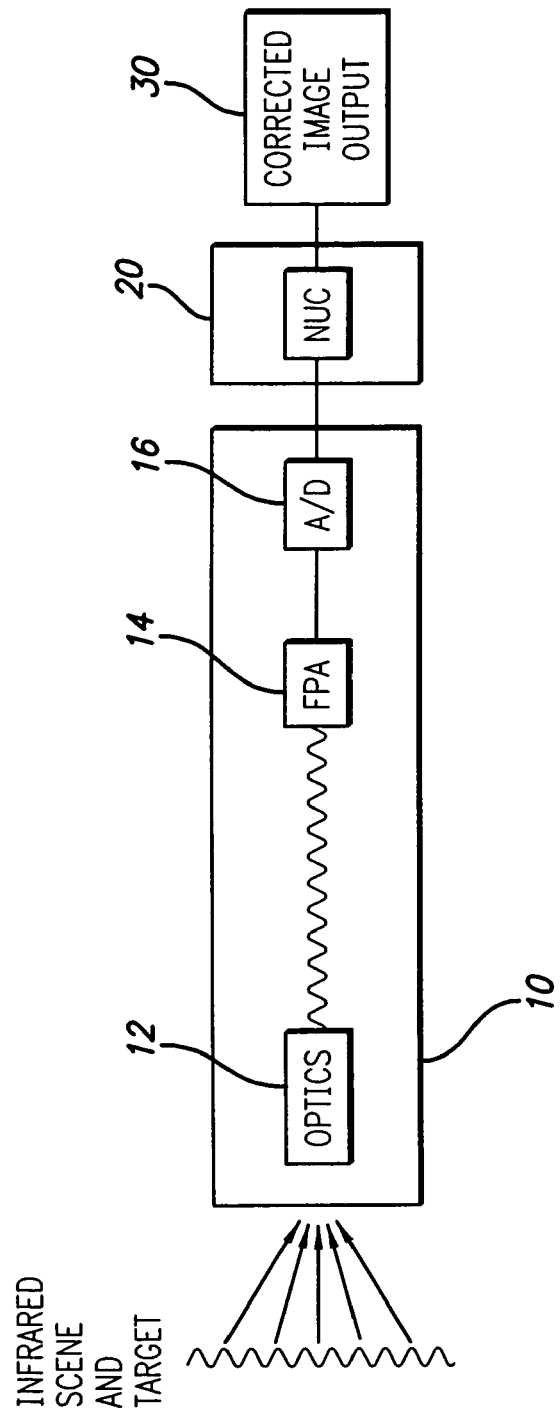
FIG. 1 is a simplified block diagram of a missile tracking system with which the present invention is advantageously utilized.

FIG. 1 is a simplified block diagram of a missile tracking system, which is disclosed in U.S. Pat. No. 5,903,659, and which includes a sensor 10 which produces an image. Typically, the sensor 10 includes optics 12 for collecting and focusing incident infrared energy from the ambient scene and target on the FPA 14, which produces an infrared image of the scene/area being tracked. The sensor 10 includes an analog-to-digital (A/D) convertor 16, which converts each of the n×n detector outputs into digital (numeric) values or pixels. The digitized images are processed by an adaptive non-uniformity compensation (ADNUC) processor 20 to provide corrected output images 30 in which scene artifacts have been reduced, and fixed pattern noise has been reduced or eliminated. The ADNUC processor 20 adjusts each pixel to compensate for the differing sensitivity of each detector in the FPA 14. The missile tracking system (not shown) then employs the corrected output images in the tracking of targets.

Figure 2:
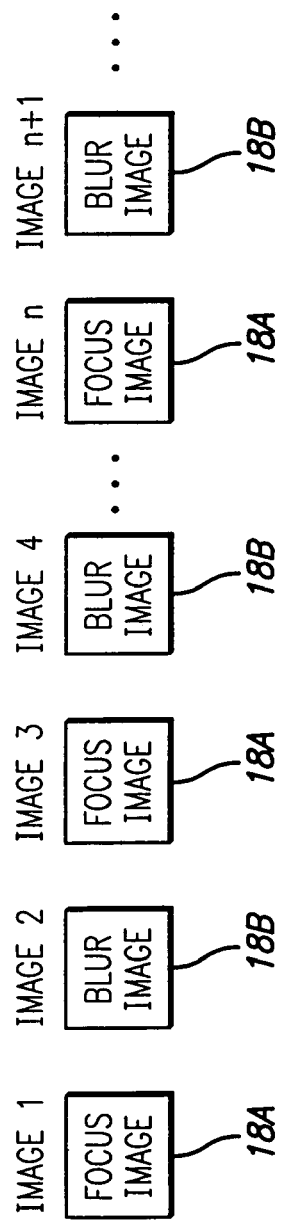
FIG. 2 illustrates a sequence of images 1 . . . n+1, alternating between a focused image and a blurred image, produced at the sensor output of the system of FIG. 1.

FIG. 2 illustrates a sequence of images 1 . . . n+1, alternating between a focused image and a blurred image. It will be noted that the sensor 10 output yields alternating focused and blurred images. The focus and blurring is controlled by the sensor optics 12. One way to achieve the focus and blurred images is to use a filter wheel in the sensor optics 12. The filter wheel spins, and has separate optics/lens to provide the focus image and the blurred image. The blurred images are used as part of the ADNUC process to help discriminate scene and target from FPN.

Figure 3:
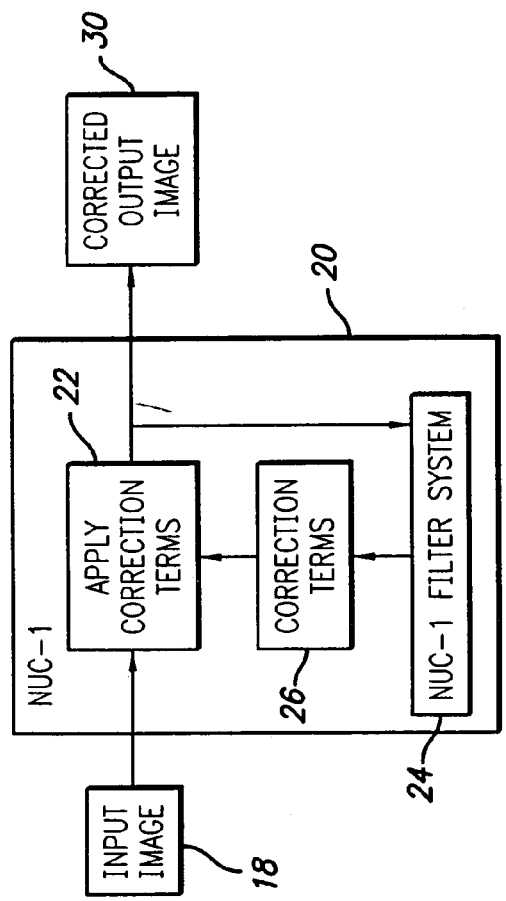
FIG. 3 is a top-level flow diagram of a conventional adaptive non-uniformity compensation (ADNUC) processor.

FIG. 3 is a top-level flow diagram illustrating the ADNUC processor. The input image 18, which is either a focused image 18A or a blurred image 18B, is received from the sensor 10. The correction terms 26 are applied to the input image at step 22 to yield a corrected output image. The correction terms are initially zeros. The corrected output image 30 is passed both to the tracking system and to the ADNUC filter system 24. A different ADNUC filter is used for both the focused and blurred images. These two filters are described below. The filter system 24 updates the correction terms 26 based on the corrected output image.

Figure 4:
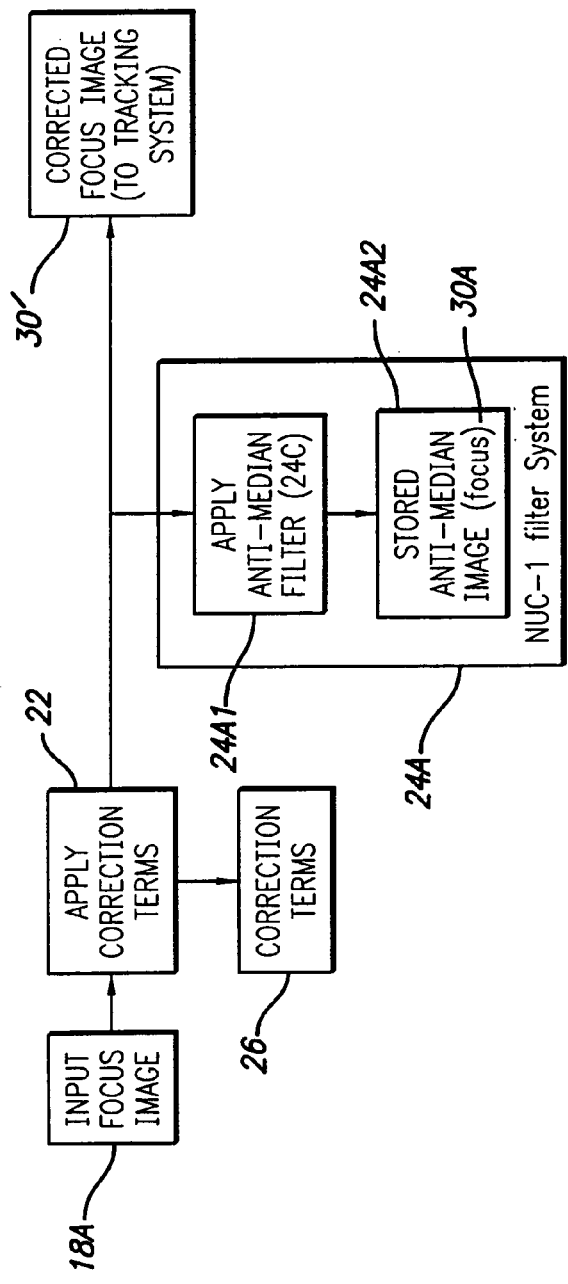
FIG. 4 is a diagram which illustrates the focused image processing of the filter system of FIG. 3.

FIG. 4 illustrates the focused image processing for the filter system 24 of FIG. 3. The input focused image 18A is received from the sensor, and the correction terms 26 are applied at step 22 to yield the corrected focused image 30, as described above. The filter system 24 includes a focused image filter 24A, which includes the application of an anti-median filter 24C at step 24A1 to the corrected focused image to yield an anti-median image 30A. The image 30A is stored in memory for use on the following blurred image 18B.

Figure 5:
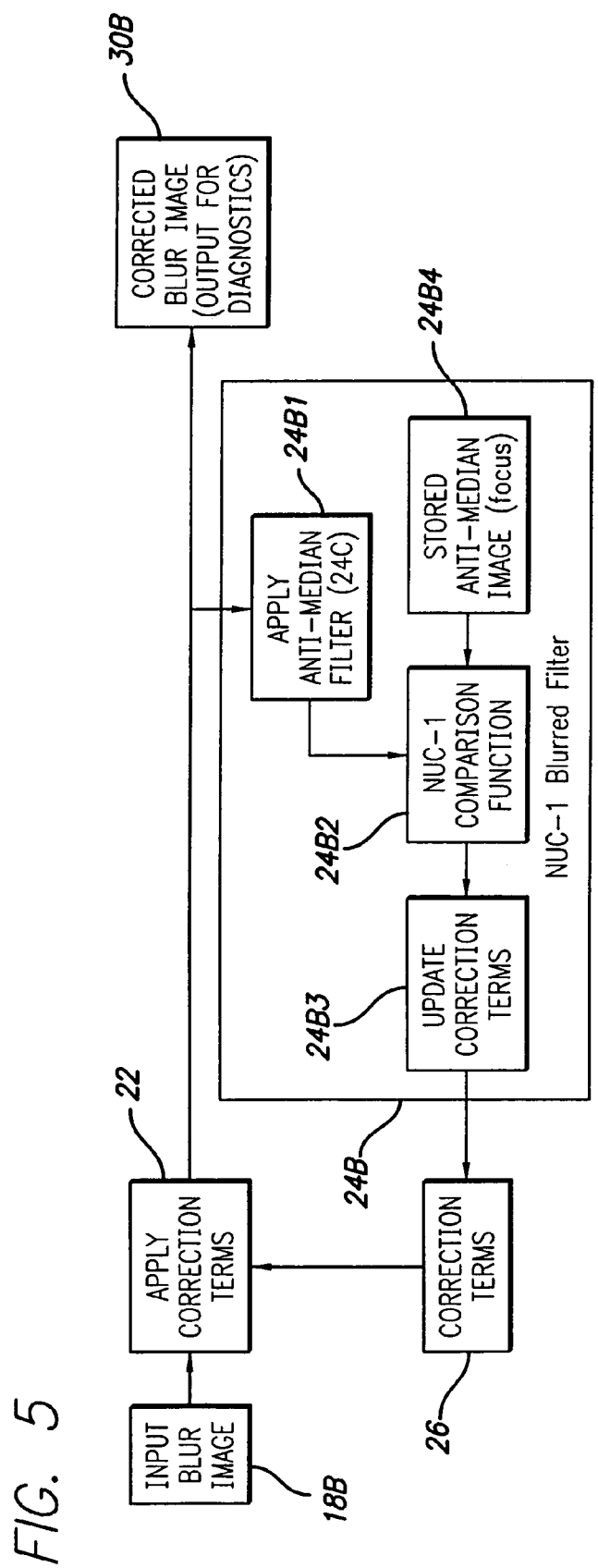
FIG. 5 is a flow diagram showing the blurred image processing for the filter system of FIG. 3.

FIG. 5 is a flow diagram showing the blurred image processing for the filter system 24 of FIG. 3. The blurred image 18B is received from the sensor 10, and the correction terms 26 are applied at step 22 to provide the corrected blur image 30B, an output useful for diagnostics. The filter system 24 includes a blurred filter 24B which includes the application of the same anti-median filter 24C used in the focused filter 24A to the corrected blurred image. As the anti-median filter is applied to the corrected blurred image, the output is compared to the filter output stored from the previous focus frame via an ADNUC comparison function 24B2. The output of the comparison function yields error terms which are used to update the correction terms for the next input focus image.

As mentioned above, techniques such as employing stored nonuniformity correction factors can correct for the nonuniform array response under static conditions, but dynamic inputs, such as changing photon flux induced by dome heating, requires dynamic or adaptive non-uniformity compensation. Because FPNs are fixed on the focal plane, and hence are temporally correlated, they present a more difficult false alarm problem than that presented by temporally uncorrelated temporal noise (TN).

Figure 6:
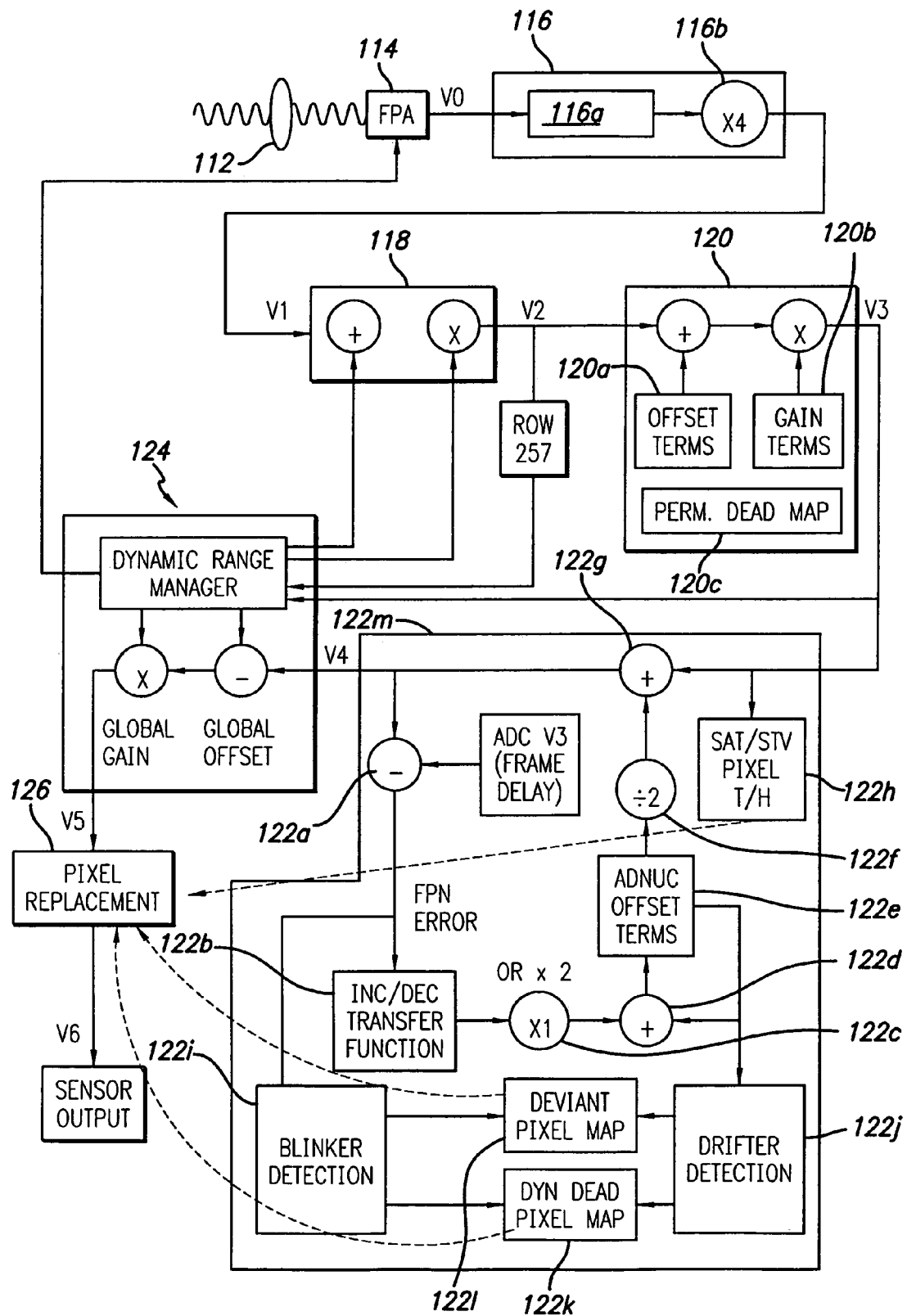
FIG. 6 illustrates a conventional second generation ADNUC system, which operates without a blurred optical system and which employs an additive feedback technique to adaptively suppress FPNs.

FIG. 6 depicts the current implementation of the traditional ADNUC, i.e., the second generation ADNUC or GEN2 ADNUC, which operates without a blurred optical system. The system of FIG. 6 employs an additive feedback technique to adaptively suppress FPNs.

All the images are focused without blurring by the optical system 112. Objects from the scene are made to nutate across the FPA 114 by a nutating (coning) system (not shown). Therefore, the scene objects (targets) will be coning across the FPA 114, while the sensor-fixed non-uniformity and FPN will not change their locations relative to the FPA 114. The output V0 of the FPA 114 is applied to an analog to digital converter (ADC) 116, which includes a twelve bit ADC 116a and a multiplier 116b, which cooperatively increase the dynamic range of the video signal V0 from twelve to fourteen bits at the output of ADC 116. The output V1 of ADC 116 is applied to a self-calibration circuit 118, which outputs a video signal V2. A stored term NUC 120 receives the output V2 and adjusts the gain and offset of the signal to thereby produce a gain adjusted output V3, which is applied to the ADNUC processor 122. It will be appreciated that the NUC 120 stores offset and gain terms in memories 120a, 120b, respectively, for each detector in the FPA 114, as well as a permanent dead map in memory 120c denoting all of the detectors which are inoperative. It will be appreciated that the gain and offset compensation of the surrounding detectors in FPA 114 is determined with respect to the stored dead map.

The ADNUC processor 122 generates an FPN error term by subtracting the mean value (ADC) from the image V3 using subtractor 122a. It should be mentioned that the Light-Weight Exo-Atmospheric Projectile (LEAP) seeker is not susceptible to hot-dome shading problems, and thus the system can employ the global mean value to remove the mean of the image (as used in GEN2 ADNUC). On the other hand, for the seekers, e.g., SM-2 Block IVA, ASRAAM, AIM-9X, with hot-dome shading problems, the system is required to use the local anti-mean filter (as used in GEN3 ADNUC) to remove the more curved dome shading. It will be appreciated that the noise (FPN, TN) in the error term will be zero-mean. The zero-mean error term generated by subtractor 112a is fed back and accumulated in ADNUC-OFFSET-TERM block 122e via an increment/decrement transfer function selector 122c, a multiplier 122d, and an adder 122d. It will be noted that the previously accumulated offset terms are then added to the current input image at adder 122g, after being gain adjusted by divider 122f, to remove FPN. Different transfer functions can be selected to balance between rapidly suppressing FPN and avoiding large increases in TN.

It will be appreciated from FIG. 6 that several detectors are included in the ADNUC 122. For example, a saturation/starvation pixel threshold detector 122h samples the input V3 of ADNUC 122 to determine whether the input V3 is outside of the operating range of ADNUC 122 on a pixel-by-pixel basis. In addition, detectors 122i and 122j are utilized to determine whether or not the input V3 is blinking and drifting, respectively. The outputs of detectors 122i and 122j are stored in deviant pixel map memory 122k and dynamic dead pixel map memory 122l, which maps are used to dictate pixel replacement by pixel replacement circuitry 126. It will be appreciated from FIG. 6 that pixel replacement circuitry 126 also receives an input from detector 122h.

The output of ADNUC 122, i.e., V4, is applied to dynamic range manager 124, which applies global gain and offset connection to V4 to thereby generate V5. The output V5 is, in turn, applied to the input of pixel replacement circuitry 126, which outputs the signal V6, which is substantially free of FPN.

Several non-traditional adaptive non-uniformity compensation (N-ADNUC) systems employing feedforward shunting (multiplicative) techniques instead of the additive feedback techniques employed in the traditional adaptive non-uniformity compensation systems (GEN3 ADNUC) were described in copending, commonly assigned patent application Ser. Nos. (09,175,213, 09/175,214, 09/175,223, which applications are incorporated herein by reference for all purposes. These N-ADNUC systems advantageously can reduce fixed pattern noise (FPN) frame by frame without. Accumulating the previous. Frames, and thus provide improved non-uniformity compensation so as to suppress dynamically varying non-uniformities, reduced artifact generation, shading suppression, and lower residual fixed pattern noise (FPN) and temporal noise (TN).

However, these N-ADNUC systems employ alternative focused and blurred frames to distinguish FPNs from targets, and thus are not applicable for the SM-3 light-weight exo-atmospheric project (LEAP) seeker (or others) which do possess a specialized blurring optical system. Current LEAP seekers are equipped with a more traditional GEN2 ADNUC system, which employs an accumulative and additive feedback technique to reduce FPN.

The non-traditional adaptive non-uniformity compensation (L-ADNUC) systems and corresponding method according to the present invention employ adaptive feedforward shunting structures for the Advanced LEAP program. The L-ADNUC processors and corresponding methods advantageously can be implemented in one of two distinct embodiments. The first preferred embodiment of the ADNUC system/method, hereinafter referred to as the L-ADNUC1 (LEAP-ADNUC1) system, the invention employs a weighted average process to rapidly suppress FPN and reduce temporal noise (TN). This system has a simple structure, is cost effective, and can be easily implemented. The second preferred embodiment of the ADNUC system/method, hereinafter referred to as the L-ADNUC2 System, employs a coning-tracing average processor to further reduce TN and to enhance sensitivity for weaker target detection (passing signal much lower than the noise level). It will be appreciated that either preferred embodiment according to the present invention rapidly and effectively reduces FPN and TN, permitting improved weak target detection and enhanced acquisition/tracking performance.

Before discussing the first and second preferred embodiments of the present invention in detail, it would be useful to enumerate the advantages of the present invention over conventional ADNUC processors. The inventive L-ADNUC1 and L-ADNUC2 systems and corresponding methods have several advantages over the traditional GEN2 ADNUC, as set forth immediately below.

(1) The feedforward-shunting technique, which can reduce FPN frame by frame without accumulating the previous frames, leads to faster adaptive processing.
(2) Results of this invention using the shunting structure show that FPN can be rapidly suppressed to near zero, TN can be effectively reduced, and the target signals can be left intact leading to less distortion and artifacts.
(3) The ADNUC threshold advantageously can be used as an adjustable (adaptive) parameter to maintain constant exceedances. Furthermore, the feedforward shunting can reduce both FPN and TN, and thus the total noise in the frame. Reduced total noise leads to increased signal-to-noise (SNR) ratio for weak-target detection.

The L-ADNUC systems according to the present invention advantageously can be used in the design and development of advanced IR imaging seekers which do not use a blurring optical system, i.e., systems employing a coning (moving) FPA system, such as the SM-3 LEAP seeker. It will be appreciated from the discussion of the preferred embodiments which follow that the invention is suitable for the design of the future IR seekers which do not have enough space for a blurring optical system (a very costly item), and for designs where payload weight is a major concern.

Recent research in human and simian visual systems have shown that shunting (multiplicative/divisive) feedback and feedforward mechanisms provide faster adaptation than traditional additive/subtractive feedback mechanism. See, for example: Hai-Wen Chen, "Modeling and Identification of Parallel Non-linear Systems: Structural Classification and Parameter Estimation Methods," *Proceedings of the IEEE*, vol. 83, pp. 39–66, 1995; S. Grossberg, "Non-linear Neural Networks: Principles, Mechanisms, and Architectures," *Neural Networks*, vol. 1, pp. 17–61, 1988; G. Sperling and M. M. Sondhi, "Model for Visual Luminance Discrimination and Flicker Detection," *J. Opt. Soc. Am.*, vol. 58, pp. 1133–1145, 1968; and M. Carandini and D. Heeger, "Summation and Division by Neurons in Primate Visual Cortex," *Science*, vol. 264, pp. 1333–1336, 1994.

Figure 7:
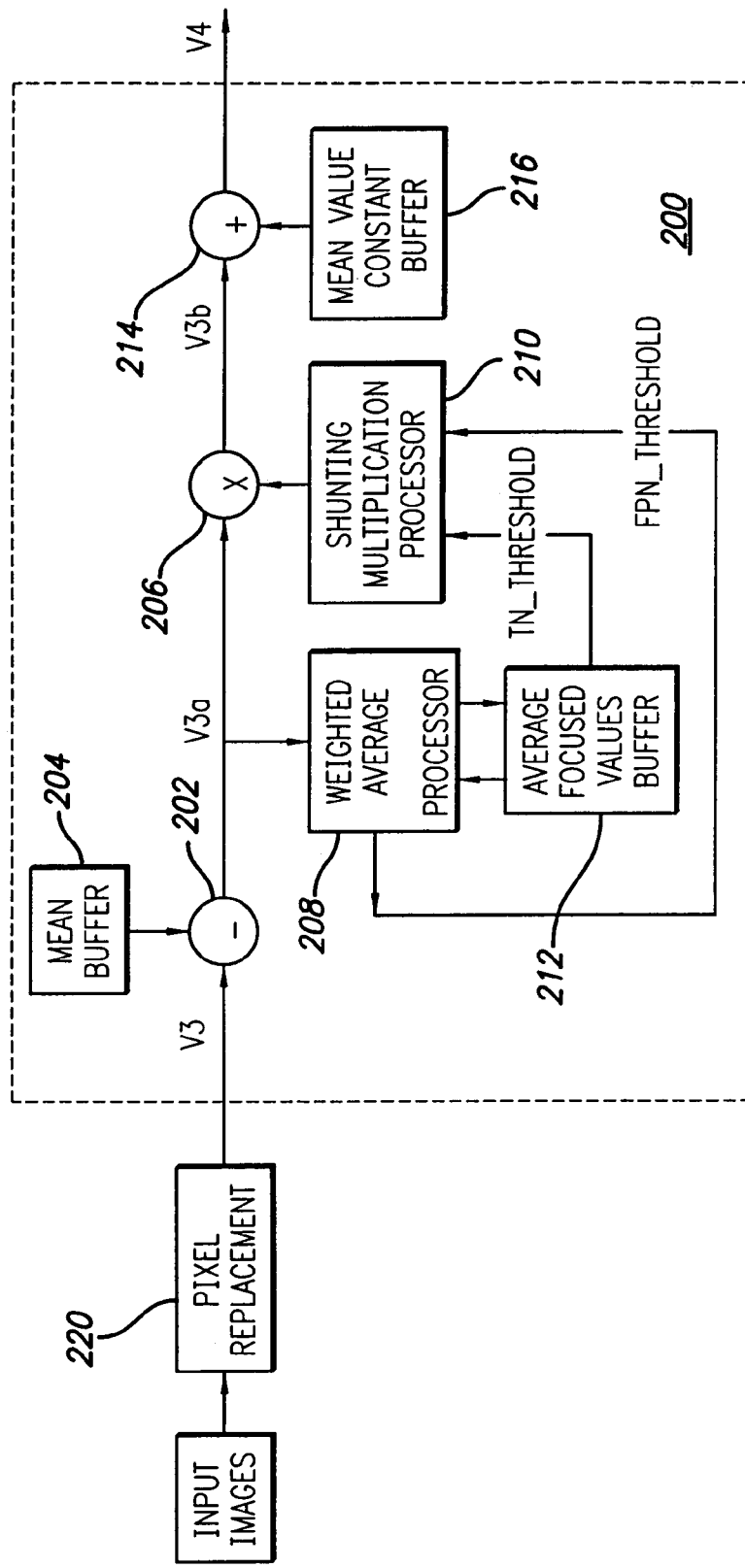
FIG. 7 is a high level block diagram of a first preferred embodiment of a system and corresponding method employing feedforward shunting techniques for removal of fixed pattern noise (FPN) from sensor images according to the present invention.
Figure 8:
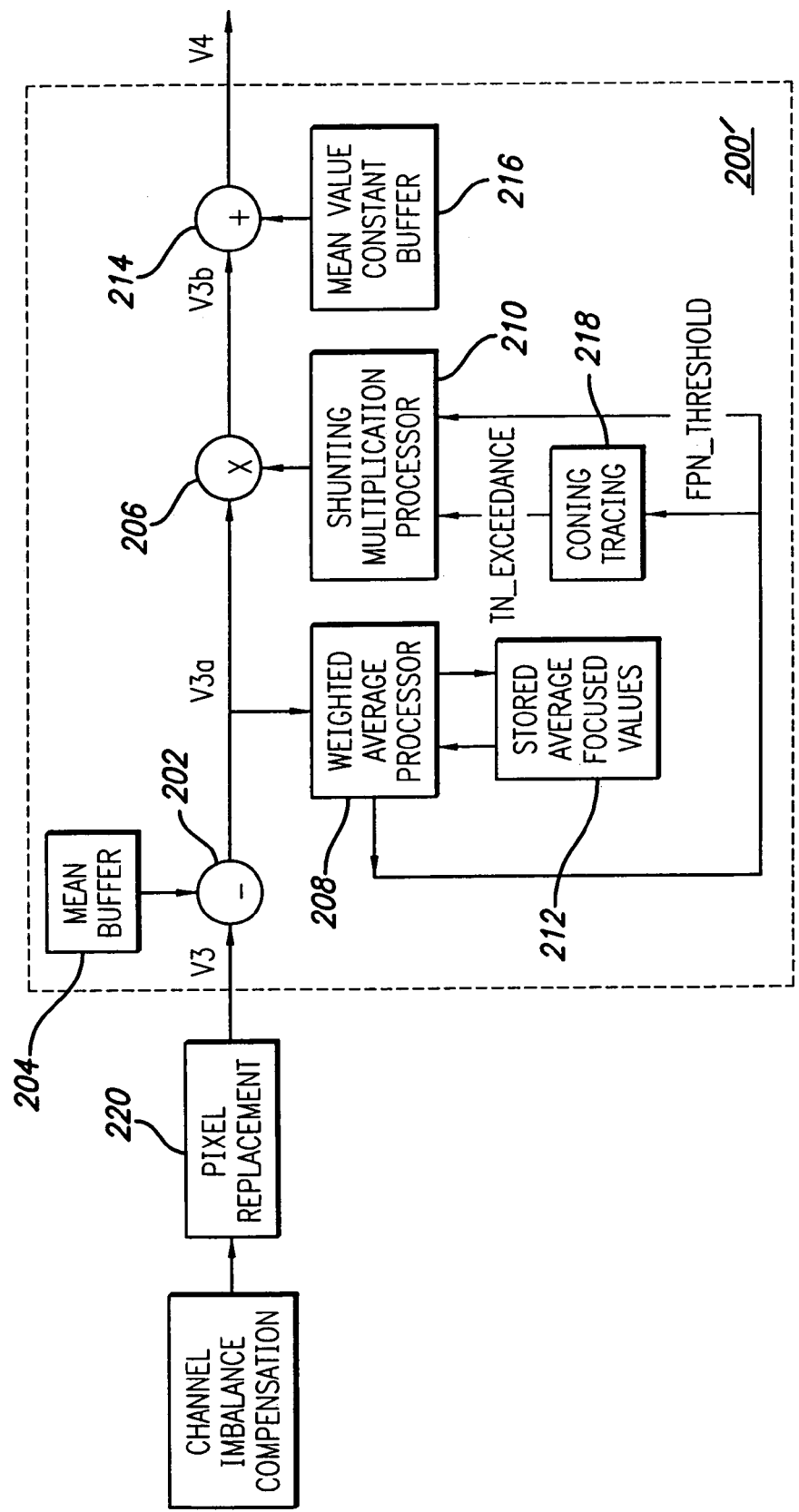
FIG. 8 is a high level block diagram of a second preferred embodiment of a system and corresponding method employing feedforward shunting for removal of fixed pattern noise (FPN) from sensor images according to the present invention.

The first and second preferred embodiments of the present invention, which are illustrated in FIGS. 7 and 8, are non-traditional ADNUC processors and corresponding methods employing a feedforward shunting technique, which advantageously can reduce FPNs on a frame-by-frame basis without the need to accumulate error terms from prior frames. As in the traditional ADNUC (GEN2), the L-ADNUC systems use a FPA coning system to separate outside scene objects and targets from spatial non-uniform regions in the image. In general terms, a Weighted Average Processor in each of the preferred embodiments performs multiple functions for identifying FPN and reducing TN. The outputs then go through TN_Thresholding and FPN_Thresholding processes before applying shunting multiplication to the input image frame. For those pixels identified to be FPN or TN, the pixel value derived from the FPA is shunted, i.e., divided by a large number, e.g., 8 to 64, or simply set the value to zero. For non-FPN and non-TN pixels, the FPA output is unmodified. It should be understood that this shunting process leads to faster adaptation and results in reduced residual FPN, TN, and artifacts. Since the shunting process does not subtract a previous image frame from the current frame, the shunting process advantageously does not create any black-hole artifacts.

In addition to rapid suppression of FPN, the disclosed L-ADNUCs have been shown to possess the following advantages:

(1) The feedback additive process used in GEN2 ADNUC generates serious black-hole artifacts that will reduce and distort the intensities of scene objects and targets. On the other hand, the feedforward shunting disclosed for the L-ADNUC systems does not create any black hole artifacts.
(2) The L-ADNUC systems advantageously permits temporal decorrelation of artifacts.
(3) The L-ADNUC systems using the shunting structure demonstrate that FPN can be rapidly suppressed to near zero, TN can be effectively reduced (eliminating the need to perform a persistency test in the tracker to remove TN), and the target signals can be left intact leading to less distortion and artifacts.
(4) The L-ADNUC systems have simpler structures and, thus, are cost effective.
(5) The thresholds associated with the L-ADNUC systems advantageously can be used as an adjustable (adaptive) parameter to maintain constant exceedances throughout operation. Furthermore, the feedforward shunting can reduce both FPN and TN and, thus, the total noise in the frame. Reduced total noise leads to an increased signal-to-noise (SNR) ratio for weak-target detection.

Referring now to FIG. 7, a first preferred embodiment according to the present invention, i.e., L-ADNUC1 200, advantageously includes a subtractor 202 receiving a input video image V3 and a mean value from mean buffer 204, which outputs a de-meaned video image V3$a$ to both shunting multiplier 206 and weighted average processor 208. It will be appreciated the mean value stored in the buffer 204 is a global mean, i.e., the average of accumulated output of ADC 116 for the present frame. The output of shunting multiplier 206, i.e., V3$b$, which is controller by the inputs from the weighted average processor 208, e.g., a programmable digital signal processor, and a buffer memory 212 storing average focused values to shunting multiplication processor 210 on a pixel-by-pixel basis, is applied to an adder 214, which advantageously combines the video image V3$b$ with a constant mean value stored in accumulator 216, to thereby generate video image V4. It will be appreciated that the L-ADNUC1 processor 200 can be employed in place of the ADNUC processor 122 illustrated in FIG. 6. It will also be appreciated that the pixel replacement circuitry 126 of FIG. 6 advantageously can be employed in place of the pixel replacement circuitry 220 of FIG. 7. It will also be understood that the placement of the pixel replacement with respect to the placement of the L-ADNUC1 processor 200 is immaterial, since it has no substantial effect upon the operation of the L-ADNUC1 processor 200.

The operation of the L-ADNUC1 according to the present invention will now be described. It will be appreciated that the coning motion equations employed with the FPA can be described by the following equations:

$$x = r \cdot \cos(\omega \cdot i) \qquad [1]$$

$$y = r \cdot \sin(\omega \cdot i) \qquad [2]$$

where:

x and y are the vertical and horizontal coordinates;

r is the radius of the coning circle;

ω is the angular speed; and i (=1, 2, 3, . . . ) is the increasing frame number.

From equations [1] and [2] it will be appreciated that for two consecutive image frames, the outside scene objects and targets will locate in different FPA pixels, but the sensor-fixed FPN and non-uniformity will stay in the same FPA pixels. The basic idea of the traditional GEN2 ADNUC is to subtract the previous image from the current image, resulting in that the scene objects and targets will remain intact but the FPN and non-uniformity will be gone. However, the positive intensities of scene objects and targets in the previous frame will create negative black-hole artifacts in the output image. Furthermore, the additive/subtractive process will significantly increase temporal noise. As will be discussed in greater detail below, the shunting/multiplicative process employed by the L-ADNUC1 processor 200 neither creates black-hole artifacts nor increases TN. Moreover, the feedforward structure advantageously permits the use of the weighted average process to further reduce TN.

Like the process implemented in GEN2 ADNUC, the de-mean processor, i.e., subtractor 202 removes the DC level of the input image V3 by subtracting the mean value (ADC) stored in mean buffer 204 from the input image V3. The noise (FPN, TN) in the de-meaned image V3a will be zero-mean. As shown in FIG. 7, the output of the de-meaned processor 202 is fed forward-via the main path to multiplier 206 and the weighted average processor 208.

The weighted average processor 208, e.g., a programmable digital signal processor, advantageously may implement one or more techniques, depending on how the user decides to weigh the previous frames versus the current one. The following recursive algorithm is typical:

$$Fca=(Fc+Fpa)/2 \quad [3]$$

where:

Fca is the current averaged frame;

Fc the current frame; and

Fpa the previous averaged frame.

It will be appreciated that equation [3] depicts and exemplary case wherein the current frame has the highest weighting and a previous frame gets less and less weighting with the passage of time, e.g., a decay rate of $\frac{1}{2}^i$, where i is the frame number. It will be noted that, because of the coning motion of FPA 114, only half of the target/object intensities in Fc are preserved in Fca. It should also be mentioned that a more general case of equation [3] is given by the equation [4]:

$$Fca=(Fc+Fpa*r)/(1+r) \quad [4]$$

where r is the weighting factor related to the decay rate of the previous frames; and all other terms are defined as discussed with respect to equation [3].

Thus, it will be appreciated that equation [3] is a special case of equation [4] when r=1. It will also be appreciated that the value of "r" can be established adaptively, e.g., from values stored in a lookup table held in buffer 212, for a plurality of operating conditions.

In general, a smaller r leads to higher weighting for the current frame. When r=0, i.e., no average, only the current frame will be used. It should be mentioned that a higher current frame weighting would preserve more target intensities and be more suitable for non-stationary cases (such as moving targets), but would be less effective in reducing temporal noise. The parameter r can be set to be adjustable depending on the applications. The regular (equally weighted) average process can be implemented according to the equation [5], which reads:

$$Fca=[Fc+Fpa*(i-1)]/i \quad [5]$$

where i (=1, 2, 3, . . . ) is the increasing frame number.

As shown in FIG. 7, the L-ADNUC1 processor 200 according to the present inventions advantageously stores the previous averaged frame Fpa in the Stored-Average-Focused-Value buffer 212. The output of the Weighted-Average-Process processor 208 is denoted by the equation:

$$Wap=Fca-Fpa \quad [6]$$

Still referring to FIG. 7, one of the control signals, FPN_Threshold, applied to shunting multiplication processor 210 is the output of the weighted average process Wap, as described in equation [6]. As discussed above, FPN and non-uniformity in both Fca and Fpa will stay at the same pixels. On the other hand, the scene objects and targets in both Fca and Fpa will locate at different pixels. Therefore, in Wap, FPN and non-uniformity are cancelled to near zero, TN will be reduced (the effect of average process), and the intensities of scene objects and targets will be reduced to half if equation [3] is used to generate Fca and Fpa. An FPN_Threshold Ft is. Chosen (as a parameter) and is compared with the absolute values of Wap (|Wap|) on a pixel-by-pixel basis. If |Wap|>Ft for a pixel location, this pixel in the current image frame will be considered as containing only the scene objects and targets, and the value in this pixel will be kept intact without being shunted out, as discussed in greater detail below. Otherwise, if |Wap|<Ft for a pixel location, this pixel in the will be considered as containing FPN and non-uniformity, and the value in this pixel will be shunted out.

Ft is an important parameter in the effort to strike a balance between reducing FPN and detecting weak targets. A lower Ft will allow weaker targets to pass on to the tracker without being shunted out. However, in this case, more FPN will also be passed. Performance results, described in detail below, demonstrate that for the L-ADNUC1 processor 200, Ft can be set very low to pass weak targets, but still sufficiently high to facilitate suppression of FPN.

The averaged focused frame advantageously can be used to set a TN threshold for reducing TN. The averaged values for pixels containing both FPN and a target will be relatively high, while the averaged values for pixels containing mostly TN, i.e., zero-mean TN after the de-mean process, will be close to zero, i.e., the average effect. The input to the TN_Threshold process is the absolute values of Fpa (|Fpa|). A TN_Threshold Tt is chosen (as a parameter) and is compared with |Fpa| pixel-by-pixel. If |Fpa|<Tt for a pixel location, this pixel in the input (current) image frame will be considered as containing TN only, and the value in this pixel will be shunted out, as discussed immediately below.

It will be appreciated that shunting is a non-linear process. For a pixel value below the FPN_Threshold or TN_Threshold, this pixel is considered as FPN or TN occupied. The shunting multiplication 206 multiplies FPN (or TN) occupied pixel value in the input (de-meaned) image V3a by a small number, typically ⅟64 to ⅛, or simply sets the value to zero. Non-FPN (or non-TN) pixels in image V3a are left unchanged (not shunted). As a result of the shunting process, the amplitudes of FPN or TN occupied pixels are driven toward zero. It will also be appreciated that the buffers 204, 212, and 216 need not be stand alone items but advantageously could be consolidated into a single buffer memory.

Furthermore, since the output of the shunting process is quite sensitive to the threshold level, as discussed in the copending application incorporated by reference, both FPN and TN thresholds can be adaptively adjustable for maintaining a constant exceedance level to the tracker, e.g., using an adjustable multiplying factor controlled adaptively by the tracker, leading to the TN_Exceedance (or FPN_Exceedance) processor discussed in greater detail with respect to FIG. 8.

After the shunting multiplication process is performed by multiplier 206, the previously measured image mean value (ADC) is added back to the output image to thereby preserve the original intensities of targets and scene objects in the video image V4 output by the L-ADNUC1 processor 200 for further target discrimination processing in the tracker circuitry.

As discussed above with respect to weighted average processor 208, the effectiveness of reducing TN depends on how the system weights the current frame relative to the previous frames. The regular (equally weighted) average process set forth in equation [5] can maximally reduce TN. However, a higher current frame weighting would preserve more target intensities and, thus, be more suitable for non-stationary cases, i.e., moving targets. In contrast, the higher current frame weighting would be less effective in reducing temporal noise. To solve this problem, the L-ADNUC2 processor 200' implements a coning tracing processor to further reduce TN without reducing target intensities. In short, the L-ADNUC2 system utilizes a coning tracing process which advantageously can significantly enhance the system sensitivity for weaker target detection, passing target signal much lower than noise level.

As shown in FIG. 8, one of the differences between L-ADNUC1 and L-ADNUC2 is the addition of Coning-Tracing circuit 218 in L-ADNUC2. The output of weighted average process Wap is fed to the coning tracing processor. In Wap, FPN and non-uniformity are cancelled to near zero, TN will be reduced (the effect of average process). As discussed above, the regular (equally weighted) average process defined in equation [5] can maximally reduce TN. However, the target intensities are also significantly reduced, since the target locations are not fixed in the FPA that is coning around and, thus, the target intensities in different frames can not be effectively summed. The coning tracing processor 218 in FIG. 8 preferably implements a modified regular (equally weighted) average process. Instead of averaging the pixel values of different image frames at the same FPA locations, the coning tracing process traces the FPA movement based on the coning motion equations (Eqs. [1], [2]), and averages the pixel values of different image frames at different FPA locations based on the FPA movement. Therefore, the coning tracing process, i.e., a temporal integration processing of the input image signal, advantageously can maximally reduce TN but still preserve the target intensities.

It should be mentioned that one problem with the single pixel tracing process is that the coning motion of FPA is a continuous process. However, the pixels in FPA are sampled, i.e., are discrete values and, thus, target intensity at a pixel of one image frame may fall onto several nearby pixels at the next image frame. To solve this problem, the L-ADNUC2 employs a pixel kernel, e.g., 3×3 or 5×5 pixels, to integrate the target intensities in the nearby pixel area, then conduct the average processing. As indicated in the discussion of performance tests below, a coning tracing process using a 3×3 kernel performed much better than a coning tracing process using single pixel.

In the output of coning tracing process Ctp, the pixels containing only TN will have very low values. For example, FIGS. 17a–17d illustrate several images from Ctp. Then either a TN_Threshold process or a TN_Exceedance process, as discussed above, advantageously can be used to shunt the TN occupied pixels out.

The operation of the L-ADNUC1 and L-ADNUC2 processors according to the present invention will now be described in detail with respect to FIGS. 9–20. It should first be mentioned that two synthetic data sets (d_1tn and d_2tn) were generated by the Advanced LEAP Lab and were used in the performance testing described below. Data set d_2tn presented a more difficult condition than d_1tn with the noise level doubled and the signal-to-noise ratios (SNR) reduced to half. It will be appreciated that each data set contains 120 consecutive 16 bits video image frames of 256×256 pixels. Four point-targets, whose intensities are gradually increased, were generated in the $1^{st}$ quadrant of the image. The FPA coning motion is set as:

$$x=11.5 \cdot \cos(0.1676 \cdot i);$$

and $$y=11.5 \cdot \sin(0.1676 \cdot i),$$

where the coning circle period is about 39 frames (i.e., $0.1676 \times 39 \approx 2\pi$).

For data set d_1tn, TN is set as 1.8 (standard deviation counts), FPN_offset is set as 1 TN, and FPN_gain is set as 1% of 1 σ. The signal-to-noise ratios (SNR) for the 4 point-targets are set as 4, 8, 12, 16, respectively. For all the 120 images, the measured total noise, FPN, and TN are 3.45, 2.8, and 1.8, respectively.

For data set d_2tn, TN is set as 1.8, FPN_offset is set as 2 TN, and FPN_gain is set as 1% of 1 σ. The SNR for the 4 point-targets are set as 2, 4, 6, 8, respectively. For all the 120 images, the measured total noise, FPN, and TN are 7.4, 7.1, and 1.9, respectively.

Data set d_2tn were run by GEN2 ADNUC in the seeker calibration and acquisition mode: an aggressive 1:1 transfer function (slope=−1) is used in the $1^{st}$ frame. Then in the consecutive image frames, the transfer function gradually changed to medium, slow, and very slow transfer functions. Although after Frame #1 most of the initial non-uniformity errors are removed, the aggressive transfer function created deep black holes caused by the inversion of the outside scene objects and targets. Four resulting images are shown in FIGS. 9a–9d (only the $1^{st}$ quadrant 128×128 portion of the images are actually shown): Frame #3 (upper-left), #15 (upper-right), #25 (lower-left), and #38 (lower-right). It will be appreciated that the aggressive transfer function generated the black holes, which stayed in the frame sequence throughout the coning period. When the targets moved back nearby the black holes after one coning period, the target intensities were reduced by more than 20 counts.

Figure 10:
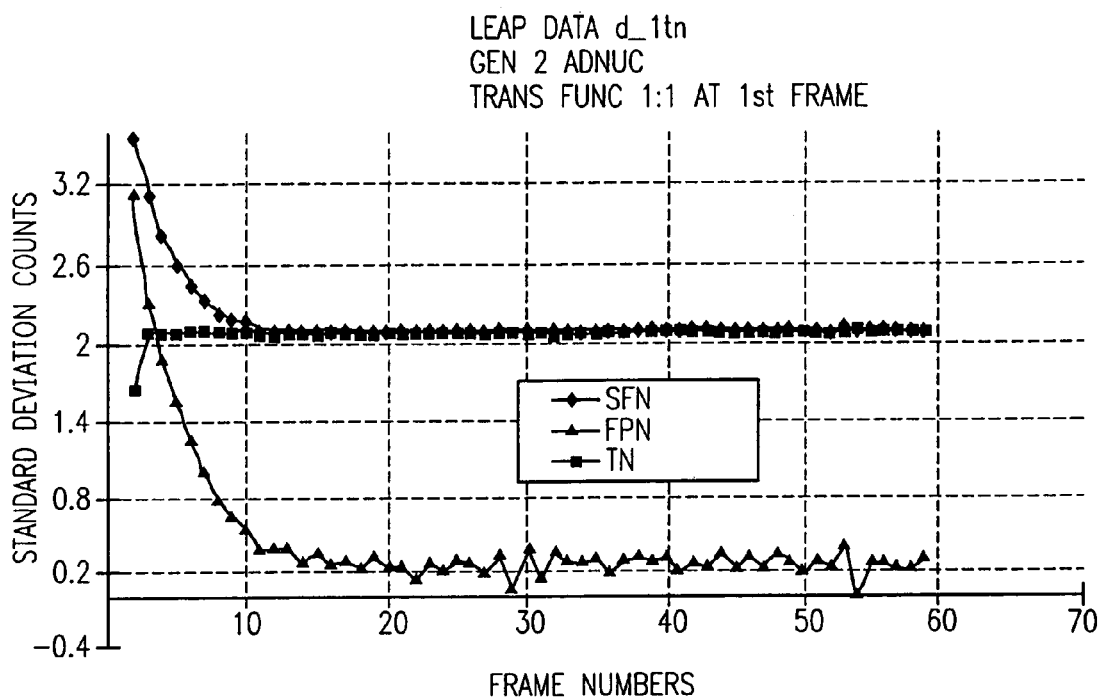
FIG. 10 illustrates noise analysis in accordance with the ADNUC system depicted in FIG. 6.

FIG. 10 illustrates the total noise (single frame noise (SFN)) when data set d_1tn is processed by GEN2 ADNUC in the seeker calibration and acquisition mode, and then noise analysis was conducted on the ADNUC processed data. As shown in FIG. 10, (only the $1^{st}$ half of the 120 image series are shown), the total noise advantageously was reduced from 3.45 to 2.2, and FPN was suppressed down to about 0.3. However, TN was increased to about 2.1. Furthermore, it takes approximately 10 frames for the total noise and FPN to reach the lower equilibrium values.

Figure 11:
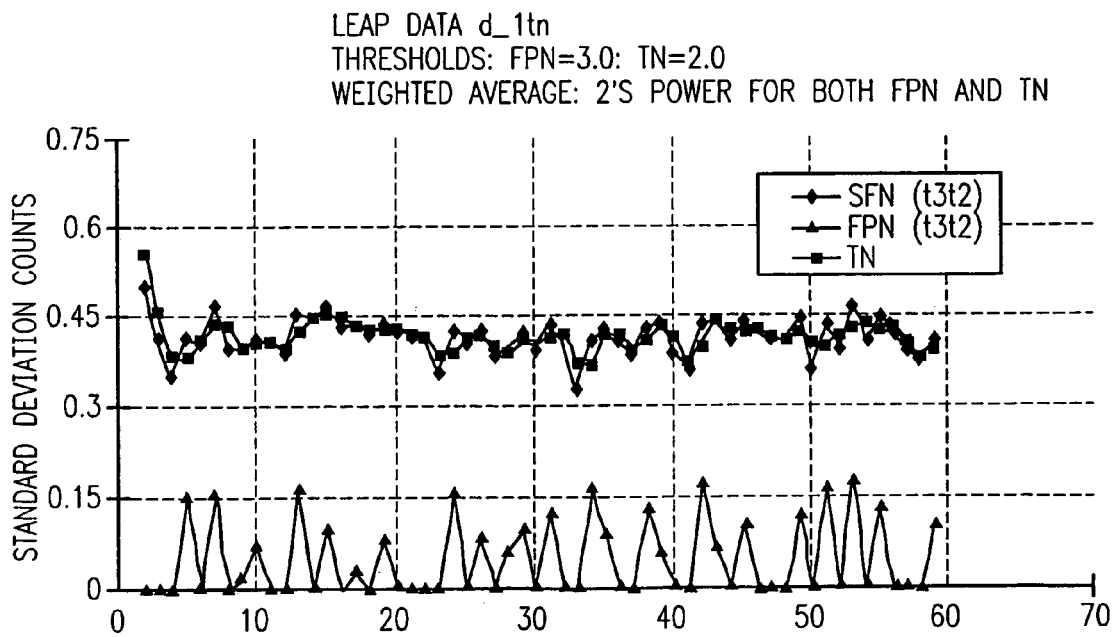
FIG. 11 illustrates noise analysis in accordance with the ADNUC processor depicted in FIG. 7.
Figure 12:
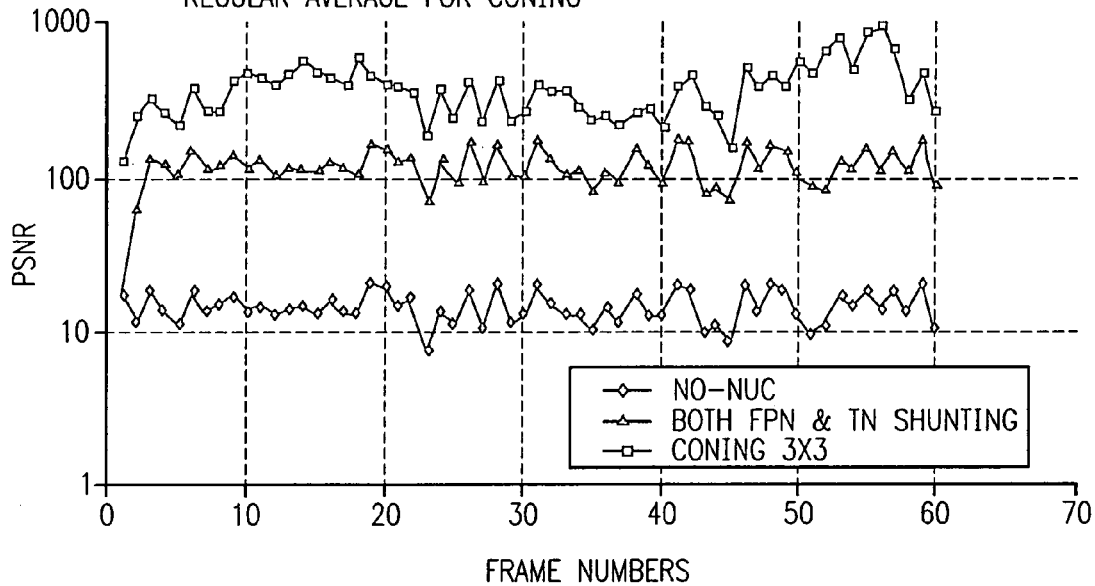
FIG. 12 illustrates signal-to-noise ratio (SNR) improvements according to the ADNUC processors depicted in FIGS. 7 and 8, as compared with that available using the ADNUC system depicted in FIG. 6 for a first set of standard test data.
Figure 13:
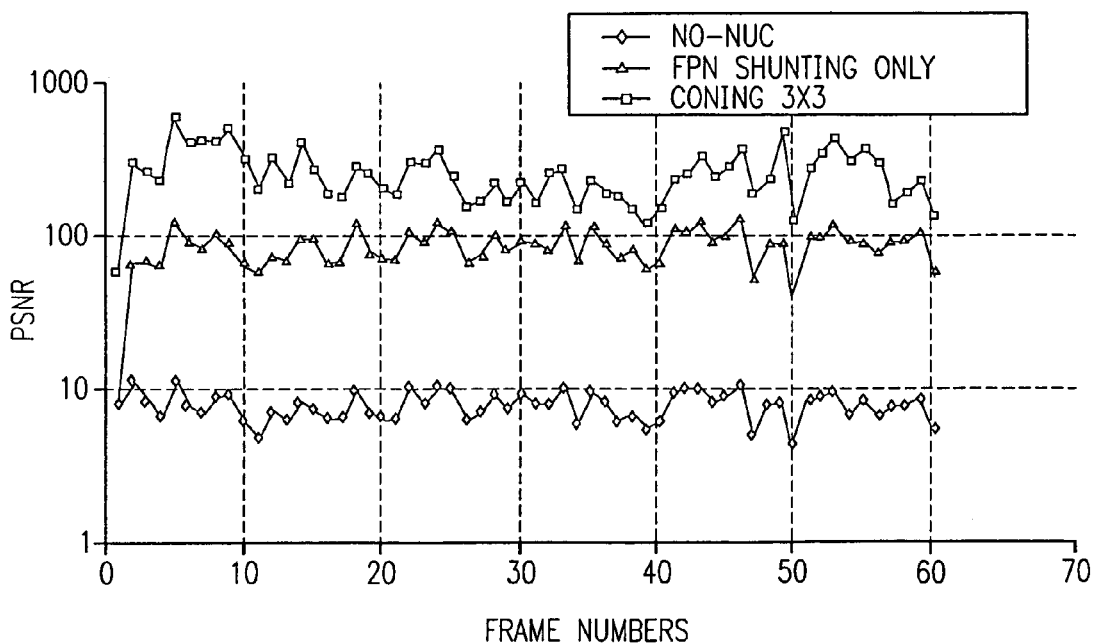
FIG. 13 illustrates signal-to-noise ratio (SNR) improvements according to the ADNUC processors depicted in FIGS. 7 and 8, as compared with that available using the ADNUC system depicted in FIG. 6 for a second set of standard test data.
Figure 14A:
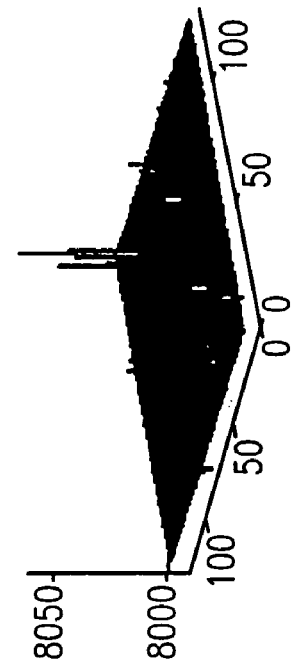
FIGS. 14a–14d are three-dimensional representations of frame data processed in accordance with the ADNUC processor of FIG. 7.
Figure 14B:
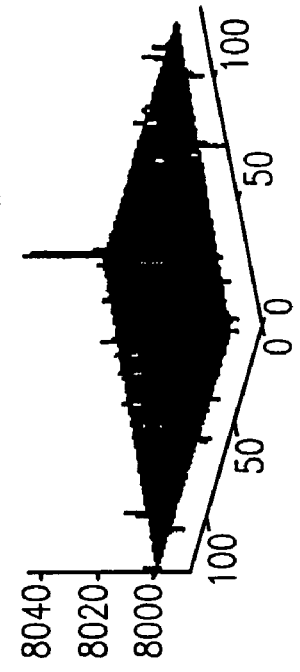
Figure 14C:
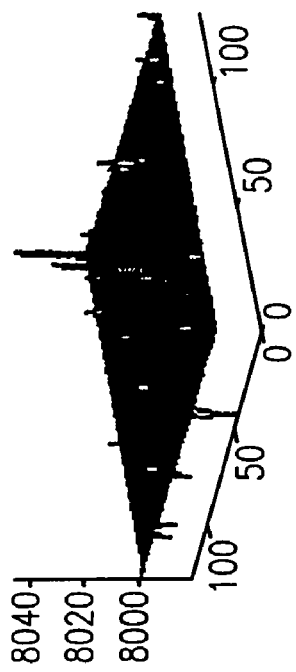
Figure 14D:
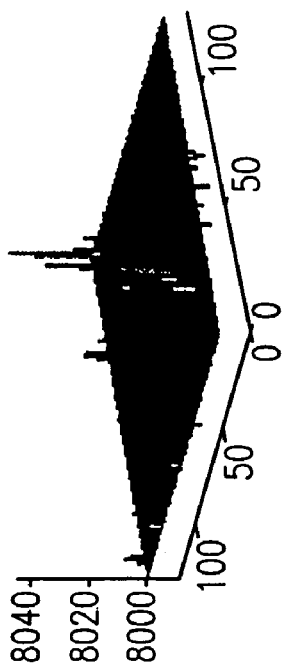
Figure 16A:
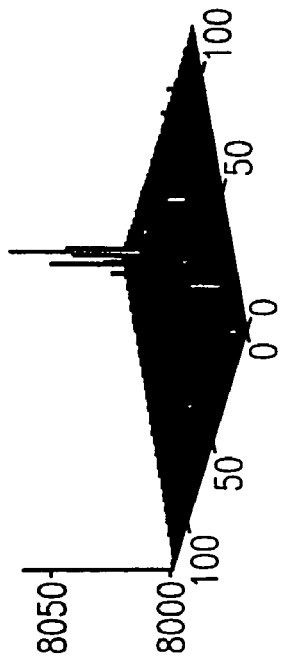
FIGS. 16a–16d are three-dimensional representations of frame data processed in accordance with the ADNUC processor of FIG. 8.
Figure 16B:
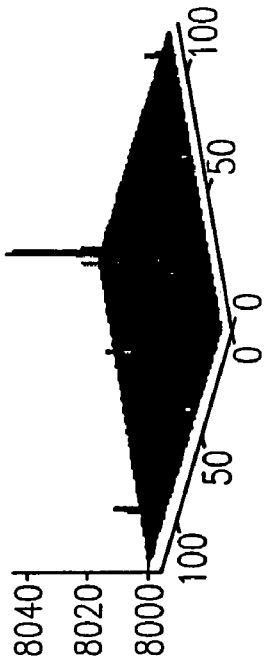
Figure 16C:
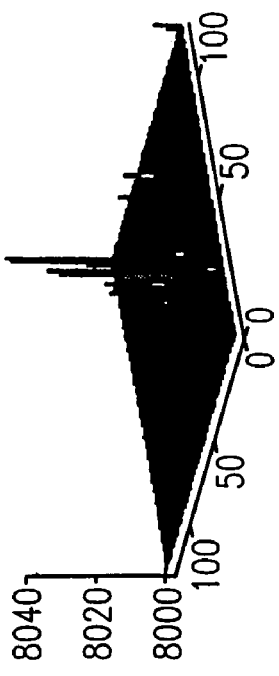
Figure 16D:
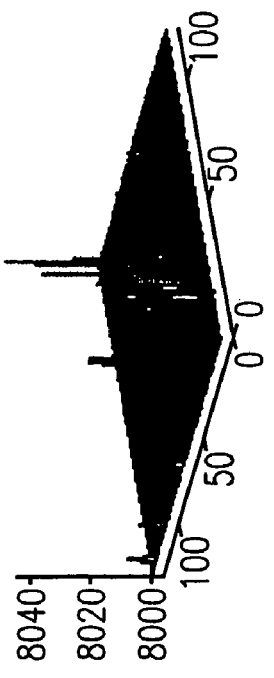
Figure 17B:
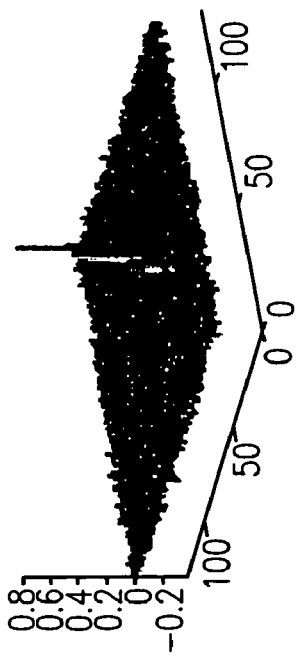
FIGS. 17a–17d are three-dimensional representations of frame data processed employing the coning tracing processor of the ADNUC processor of FIG. 8.
Figure 17D:
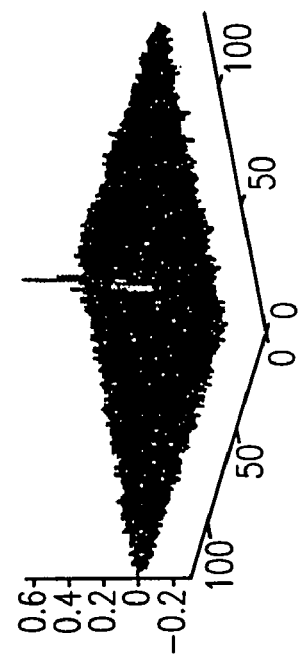
Figure 17A:
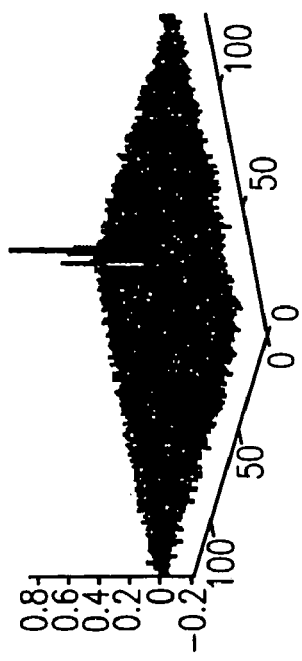
Figure 17C:
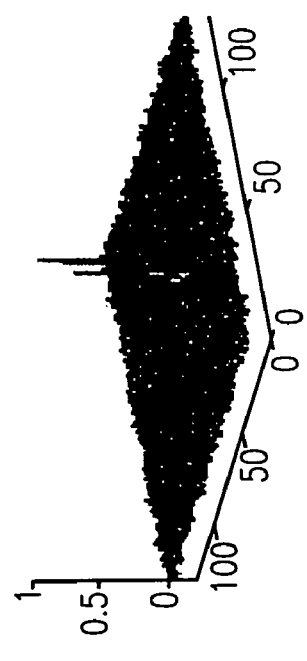
Figure 19A:
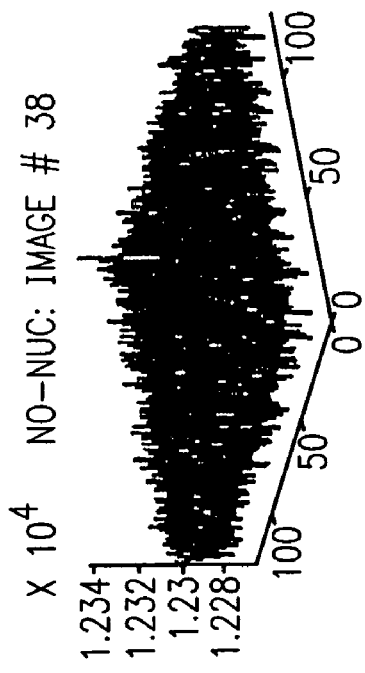
FIGS. 19a–19d are three-dimensional representations of frame data processed without the ADNUC processor.
Figure 19B:
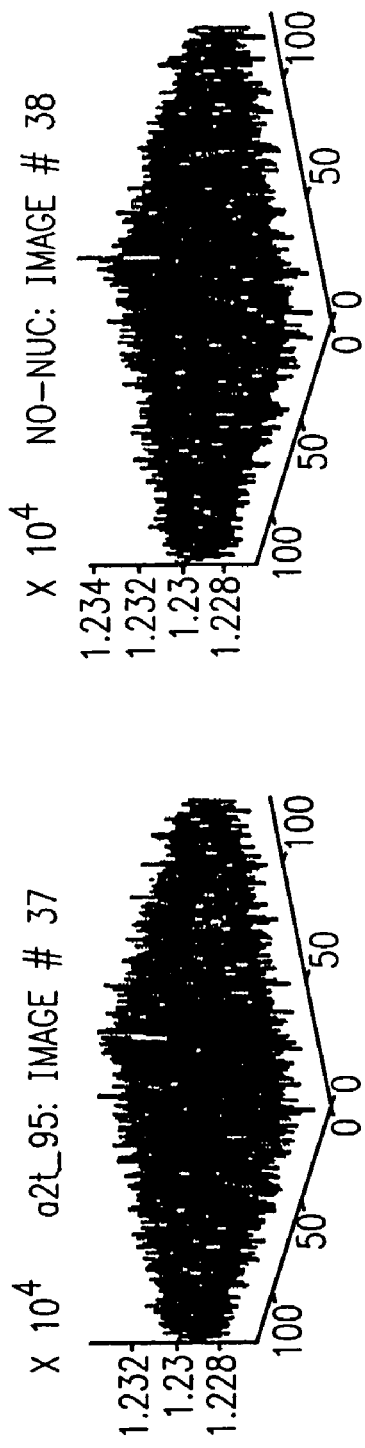
Figure 19C:
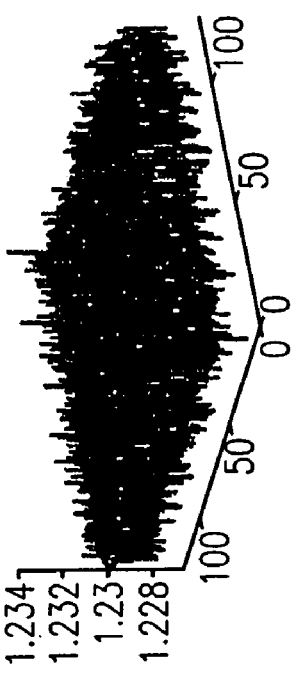
Figure 19D:
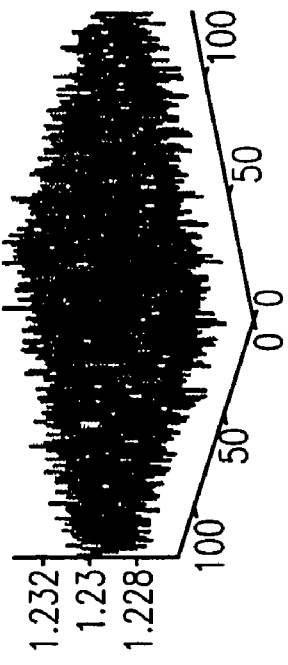
Figure 20B:
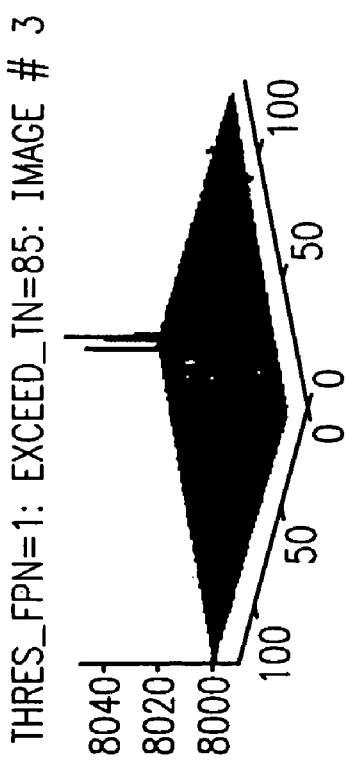
FIGS. 20a–20d are three-dimensional representations of frame data processed in accordance with the ADNUC processor of FIG. 8.
Figure 20D:
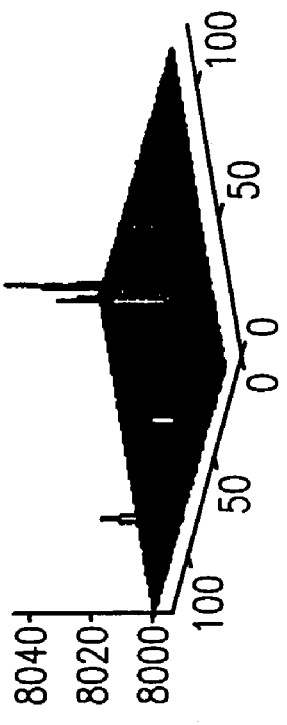
Figure 20A:
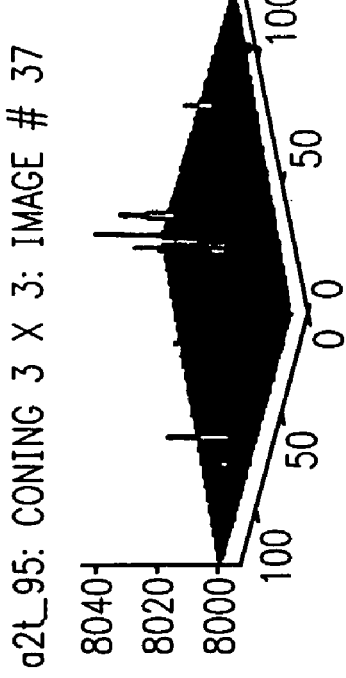
Figure 20C:
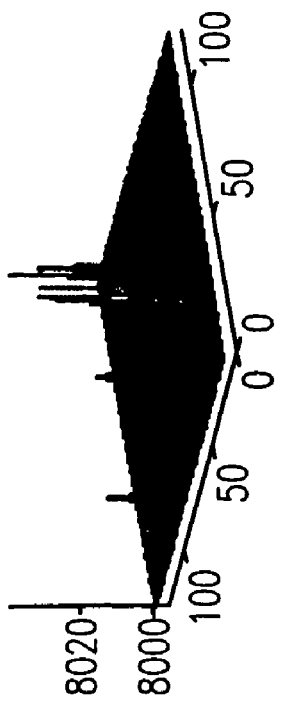

The two data sets were processed by L-ADNUC1 processor 200 and then noise analysis was conducted on the processed data. Equation [3] was used for the weighted average process. The FPN threshold Ft=3, and the TN threshold Tt=2. As shown in FIG. 11 for the data set d_1tn, both the total noise (SFN) and TN were reduced from 3.45 to about 0.4, and FPN is suppressed down to about 0.1. Moreover, it takes only 2 frames for the total noise and TN to reach the lower equilibrium values, and takes no time for FPN to approximate the lower equilibrium values. FIGS. 12 and 13 illustrate that the L-ADNUC1 improved the average peak SNR from 15 (before the L-ADNUC1 process; the lower curve) to 123 (after the L-ADNUC1 process; the middle curve) for data set d_1tn, and improved the average peak SNR from 7.9 to 85 for data set d_2tn.

FIGS. 14a–14d illustrate four consecutive images processed by L-ADNUC1 for data set d_1tn. These images clearly demonstrated that most of the FPN and TN have been removed but the four point-targets in each image are still kept intact.

In addition, the two data sets were first processed by L-ADNUC2 system with the coning tracing processor, and then noise analysis was conducted on the processed data. Equation [3] was used for the weighted average process feeding to FPN_Threshold process. The FPN threshold Ft=1, and the TN exceedance is set Te=85. The regular average process (equation [5]) was used for the coning tracing process, and the coning kernel consisting of 3×3 pixels was employed.

As shown in FIG. 15, both the total noise (SFN) and TN were reduced from 3.45 and 1.8 to below 0.2, and FPN is suppressed down to below 0.1. Moreover, it takes no time for FPN to go down to the lower equilibrium values. FIGS. 12 and 13 further illustrate that the L-ADNUC2 further improved the average peak SNR from 123 (by the L-ADNUC1 process; the middle curve) to 398 (by the L-ADNUC2 process; the upper curve) for data set d_1tn and further improved the average peak SNR from 85 to 265 for data set d_2tn.

FIGS. 16a–16d illustrate four consecutive images processed by L-ADNUC2 for data set d_1tn. These images clearly demonstrate that L-ADNUC2 can further reduce FPN and TN than L_ADNUC1 does when comparing FIGS. 16a–16d with FIGS. 14a–14d.

FIGS. 17a–17d collectively illustrate several images at different times from the output of Coning Tracing Process (3×3 coning kernel) Ctp. Moreover, FIGS. 17a–17d indicate that the coning tracing process can significantly reduce TN but still keep the targets with high values.

FIG. 18 illustrates the noise analysis results obtained by L-ADNUC2 using data set d_2tn with higher noise level. As shown in this Figure, both the total noise (SFN) and TN were reduced from 7.4 and 1.9 to below 0.3, FPN is suppressed from 7.1 down to below 0.15, and it takes no adaptive time for FPN to go down to the lower equilibrium values.

FIGS. 19a–19d illustrate four consecutive images from the original data set d_2tn (without ADNUC processing). It will be appreciated that the SNR of these images are very low (low observable), and the targets are almost buried in the noise. Nevertheless, as shown in FIGS. 20a–20d, both FPN and TN can be significantly suppressed for the same images after being processed by L-ADNUC2.

As discussed above, the present invention provides two preferred embodiments of adaptive nonuniformity compensation (ADNUC) systems, i.e., L-ADNUC1 and L-ADNUC2, based on the principle of feedforward shunting. These systems do not use a blurring optical system, relying instead on coning the FPA. Moreover, these systems are useful for IR seekers which do not have enough space for a blurring optical system or when cost and/or weight reduction is/are a major concern. The L-ADNUC1 system uses a weighted average process to rapidly suppress FPN and reduce temporal noise (TN). This system has a simple structure, is cost effective, and can be easily implemented. It can preserve target signal intensity without causing distortion and black-hole artifacts, which are the major concern in more traditional designs. The L-ADNUC2 System uses a coning-tracing average process to further reduce TN and thus enhance sensitivity for weaker target detection.

As shown in FIGS. 9a–9d, the black holes generated in GEN2 ADNUC process can reduce target intensities by more than 20 counts. Furthermore, the additive process in GEN2 ADNUC adding ADNUC offset terms to the input image will further change the target intensities. As discussed above, high fidelity measurements of intensities of different objects are crucial to the success in discriminating the RV (Re-entry Vehicle) from other objects. As shown in FIGS. 14a–14d, 16a–16d, and 20a–20d, the L-ADNUC1 and L-ADNUC2 processors neither generate black holes nor change target intensities, since the shunting process passes target occupied pixel values in the input images to the tracker without being changed (not shunted). Furthermore, since the L-ADNUC1 and L-ADNUC 2 processors advantageously can significantly reduce TN, the persistency test component (for removing TN) in the tracker is no longer needed and, thus, can be completely eliminated.

It will be appreciated that the minimum detectable intensity (MDI) depends on the FPN threshold Ft. Any target intensity below Ft will be shunted out. However, if the user sets Ft to too low a value, a significant amount of FPN will also be passed to the tracker without being shunted. The performance results presented above demonstrate that both L_ADNUC1 and L_ADNUC2 can set the Ft quite low for weak target detection, but still shunt out most of FPN. For L-ADNUC1, Ft is set as 3. Therefore, the MDI is 6, since equation [3] was used for the weighted average process and, thus, the target intensities in Wap were only half of the original target intensities in the input images. This is quite a low number, even lower than the total noise level, 7.4, for data set d_2tn. For L-ADNUC2, Ft is set as 1, and thus the MDI is 2, even lower than the total noise level, 3.45, for data set d_1tn. It will be appreciated that the coning tracing processor in L-ADNUC2 can significantly reduce TN. Therefore, for a same exceedance level, the L-ADNUC2 processor advantageously can exploit a lower Ft value for weaker target detection.

It will be appreciated that the discussion above provides only a brief mention with respect to pixel replacement. Nevertheless, it will also be appreciated by one of ordinary skill in the art that, as in the design of GEN2 ADNUC, the de-meaned current image frame Fc in L-ADNCU1 and L-ADNUC2 can be employed as the input to the Blinker-Detection processor, while the output from Stored-Average-Focused-Values block in L-ADNUC1 and L-ADNUC2 advantageously can be used as the input to Drafter-Detection processor.

In short, the L-ADNUC1 processor according to the first preferred embodiment of the present invention advantageously does not generate black hole artifacts. Moreover, the L-ADNUC1 processor has a simple structure, which can be implemented in a cost effective manner, Furthermore, the L-ADNUC1 processor and corresponding method advantageously reduces FPN from about 2.8 to almost zero for data set d_1tn while it reduces total noise and TN from about 3.45 and 1.8 to about 0.4 for data set d_1tn (vs. an increase of TN from 1.8 to 2.1 by GEN2 ADNUC). In addition, the L-AD- NUC1 processor increases SNR from about 15 to about 123 for data set d_1*tn* while it increases SNR from about 7.9 to about 85 for data set d_2*tn*. It will also be appreciated from FIGS. 9–20 that L-ADNUC 1 includes a fast dynamic adaptive property, i.e., essentially no time is taken for suppressing FPN in contrast to the 10 frames for FPN decay required by the conventional GEN2 ADNUC processor.

Moreover, the L-ADNUC2 processor according to the second preferred embodiment of the present invention similarly does not generate black hole artifacts. Moreover, the L-ADNUC2 processor and corresponding method exhibits enhanced sensitivity for weaker target detection by applying coning tracing process (passing signal much lower than noise level: MDI=2.0). Advantageously, the L-ADNUC2 processor reduces total nose from about 0.4 to below 0.2 and reduces FPN from about 2.8 to almost zero, and increases SNR from about 123 to about 398 for data set d_1*tn*. In addition, the L-ADNUC2 processor and corresponding method reduces FPN from about 7.1 to almost zero while increasing SNR from about 85 to about 265 for data set d_2*tn*. In addition, the L-ADNUC2 processor and corresponding method exhibits a fast dynamic adaptive property, with essentially no time taken for suppressing FPN in contrast to the approximately 10 frames required for FPN decay by the conventional GEN2 ADNUC processor.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A feedforward adaptive non-uniformity compensation processor comprising:
   a multiplier receiving a video image and generating a compensated video image by multiplying the video signal by one of a noise reducing constant and one; and
   a shunting multiplication processor which supplies a selected one of the noise reducing constant and one to the multiplier in response to the presence of fixed pattern noise (FPN) or temporal noise (TN) in adjacent frames of the video image.

2. An adaptive non-uniformity compensation processor comprising:
   a subtractor receiving a video image and subtracting a mean value of the video image to thereby generate a de-meaned video image;
   a first processor generating a current average frame responsive to the de-meaned video image and a previous averaged frame and generating a value indicative of fixed pattern noise (FPN) from the current and previous averaged frames;
   a second processor selectively generating first and second multiplication constants responsive to the value and the previous averaged frame;
   a multiplier for multiplying the selected one of the first and second multiplication constants by the de-meaned video image to thereby generate a shunt processed video signal; and
   an adder adding the mean value of the video image to the shunt processed video image to thereby generate a compensated video image.

3. The adaptive non-uniformity compensation processor as recited in claim 2, wherein the first multiplication constant is zero and the second multiplication constant is one.

4. The adaptive non-uniformity compensation processor as recited in claim 2, wherein the second processor compares the value to a predetermined threshold value to thereby cause the lower of the first and second multiplication constants to be output to the multiplier when the value indicates the presence of FPN.

5. The adaptive non-uniformity compensation processor as recited in claim 2, wherein the second processor compares the previous averaged frame to a predetermined threshold value on a pixel-by-pixel basis to thereby cause the lower of the first and second multiplication constants to be output to the multiplier when the previous averaged frame indicates the presence of temporal noise (TN).

6. The adaptive non-uniformity compensation processor as recited in claim 2, wherein the second processor compares the value and the previous averaged frame to respective first and second predetermined threshold values to thereby cause the lower of the first and second multiplication constants to be output to the multiplier when the value indicates the presence of FPN or to thereby cause the lower of the first and second multiplication constants to be output to the multiplier when the previous averaged frame indicates the presence of temporal noise (TN).

7. An adaptive non-uniformity compensation processor comprising:
   a subtractor receiving a video image and subtracting a mean value of the video image to thereby generate a de-meaned video image;
   a first processor generating a current average frame responsive to the de-meaned video image and a previous averaged frame and generating a value indicative of fixed pattern noise (FPN) from the current and previous averaged frames;
   a second processor receiving the value and generating an averaged value corresponding to a predetermined number of grouped pixels;
   a third processor selectively generating first and second multiplication constants responsive to the value and the averaged value;
   a multiplier for multiplying the selected one of the first and second multiplication constants by the de-meaned video image to thereby generate a shunt processed video signal; and
   an adder adding the mean value of the video image to the shunt processed video image to thereby generate a compensated video image.

8. The adaptive non-uniformity compensation processor as recited in claim 7, wherein the first multiplication constant is zero and the second multiplication constant is one.

9. The adaptive non-uniformity compensation processor as recited in claim 7, wherein the third processor compares the value to a predetermined threshold value on a pixel-by-pixel basis to thereby cause the lower of the first and second multiplication constants to be output to the multiplier when the value indicates the presence of FPN.

10. The adaptive non-uniformity compensation processor as recited in claim 7, wherein the third processor compares the averaged value to a predetermined threshold value on a pixel-by-pixel basis to thereby cause the lower of the first and second multiplication constants to be output to the multiplier when the previous averaged frame indicates the presence of temporal noise (TN).

11. The adaptive non-uniformity compensation processor as recited in claim 7, wherein the third processor compares the value and the averaged value to respective first and second predetermined threshold values to thereby cause the lower of the first and second multiplication constants to be output to the multiplier when the value indicates the presence of FPN or to thereby cause the lower of the first and second multiplication constants to be output to the multiplier when the previous averaged frame indicates the presence of temporal noise (TN).

12. An adaptive non-uniformity compensation method for video images comprising:

subtracting a mean value of the video image to thereby generate a de-meaned video image;

generating a current average frame responsive to the de-meaned video image and a previous averaged frame;

generating a value indicative of fixed pattern noise (FPN) from the current and previous averaged frames;

selecting one of first and second multiplication constants responsive to the value and the previous averaged frame;

multiplying the selected one of the first and second multiplication constants by the de-meaned video image to thereby generate a shunt processed video signal; and adding the mean value of the video image to the shunt processed video image to thereby generate a compensated video image.

13. The adaptive non-uniformity compensation method as recited in claim 12, wherein the first multiplication constant is zero and the second multiplication constant is one.

14. The adaptive non-uniformity compensation method as recited in claim 12, wherein the selecting step further comprises comparing the value to a predetermined threshold value to thereby cause the lower of the first and second multiplication constants to be output when the value indicates the presence of FPN.

15. The adaptive non-uniformity compensation method as recited in claim 12, wherein the selecting step further comprises comparing the previous averaged frame to a predetermined threshold value on a pixel-by-pixel basis to thereby cause the lower of the first and second multiplication constants to be output when the previous averaged frame indicates the presence of temporal noise (TN).

16. The adaptive non-uniformity compensation method as recited in claim 12, wherein the selecting step further comprises comparing the value and the previous averaged frame to respective first and second predetermined threshold values to thereby cause the lower of the first and second multiplication constants to be output when the value indicates the presence of FPN or to thereby cause the lower of the first and second multiplication constants to be output when the previous averaged frame indicates the presence of temporal noise (TN).

17. An adaptive non-uniformity compensation method for video images comprising:

subtracting a mean value of the video image to thereby generate a de-meaned video image;

generating a current average frame responsive to the de-meaned video image and a previous averaged frame;

generating a value indicative of fixed pattern noise (FPN) from the current and previous averaged frames;

generating an averaged value corresponding to a predetermined number of grouped pixels present in the value;

selecting one first and second multiplication constants responsive to the value and the averaged value;

multiplying the selected one of the first and second multiplication constants by the de-meaned video image to thereby generate a shunt processed video signal; and adding the mean value of the video image to the shunt processed video image to thereby generate a compensated video image.

18. The adaptive non-uniformity compensation method as recited in claim 17, wherein the first multiplication constant is zero and the second multiplication constant is one.

19. The adaptive non-uniformity compensation method as recited in claim 17, wherein the selecting step further comprises comparing the value and the averaged value to respective first and second predetermined threshold values to thereby cause the lower of the first and second multiplication constants to be output when the value indicates the presence of FPN or to thereby cause the lower of the first and second multiplication constants to be output when the previous averaged frame indicates the presence of temporal noise (TN).

* * * * *